(12) United States Patent
Cherkasova

(10) Patent No.: US 7,174,334 B2
(45) Date of Patent: Feb. 6, 2007

(54) SYSTEM AND METHOD FOR EFFICIENTLY REPLICATING A FILE AMONG A PLURALITY OF RECIPIENTS

(75) Inventor: Ludmila Cherkasova, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 679 days.

(21) Appl. No.: 10/345,716

(22) Filed: Jan. 16, 2003

(65) Prior Publication Data

US 2004/0143575 A1   Jul. 22, 2004

(51) Int. Cl.
*G06F 7/00* (2006.01)
*G06F 17/30* (2006.01)
*G06F 12/00* (2006.01)
*G06F 15/173* (2006.01)

(52) U.S. Cl. .................. 707/10; 707/204; 709/226
(58) Field of Classification Search .............. 707/10, 707/101, 104.1, 204; 709/222, 226, 236, 709/219, 235; 711/173
See application file for complete search history.

(56) References Cited

U.S. PATENT DOCUMENTS

| | | | |
|---|---|---|---|
| 5,832,522 A * | 11/1998 | Blickenstaff et al. ....... 707/204 |
| 5,835,757 A * | 11/1998 | Oulid-Aissa et al. ......... 707/10 |
| 5,963,944 A | 10/1999 | Adams | |
| 6,205,445 B1 | 3/2001 | Tokuyama | |
| 6,230,251 B1 | 5/2001 | Batten et al. | |
| 6,233,252 B1 | 5/2001 | Barker et al. | |
| 6,269,080 B1 | 7/2001 | Kumar | |
| 6,397,251 B1 | 5/2002 | Graf | |
| 6,405,219 B2 | 6/2002 | Saether et al. | |
| 6,449,688 B1 | 9/2002 | Peters et al. | |
| 6,477,583 B1 | 11/2002 | Zayas et al. | |
| 6,493,877 B1 | 12/2002 | Yamazaki et al. | |
| 6,772,337 B1 * | 8/2004 | Yener ........................ 713/165 |
| 6,857,012 B2 * | 2/2005 | Sim et al. .................... 709/222 |
| 6,865,601 B1 * | 3/2005 | Cherkasova et a. ......... 709/220 |
| 6,925,499 B1 * | 8/2005 | Chen et al. ................. 709/226 |
| 6,970,939 B2 * | 11/2005 | Sim ............................ 709/236 |
| 7,080,400 B1 * | 7/2006 | Navar ........................ 725/139 |
| 2002/0083118 A1 | 6/2002 | Sim | |

(Continued)

OTHER PUBLICATIONS

Shamkant Navathe, Stefano Ceri, Gio Wiederhold, and Jinglie Dou (1984), Veritcal Partitioning Algorithms for Database Design, pp. 680-710.*

(Continued)

Primary Examiner—Dong Wong
Assistant Examiner—Merilyn Nguyen
(74) Attorney, Agent, or Firm—Richard P. Lange

(57) ABSTRACT

A system and method for distributing a file from a first node to a plurality of recipient nodes are provided. The method comprises partitioning a file into a plurality of subfiles, and distributing the plurality of subfiles from a first node to a first group comprising a plurality of recipient nodes, wherein at least one subfile is distributed from the first node to each recipient node of the first group but not all of the plurality of subfiles are distributed from the first node to any of the recipient nodes of the first group. The method further comprises the plurality of recipient nodes of the first group exchanging their respective subfiles such that each recipient node of the first group obtains all of the plurality of subfiles.

34 Claims, 5 Drawing Sheets

U.S. PATENT DOCUMENTS

2002/0083187 A1    6/2002   Sim et al.
2004/0088380 A1*   5/2004   Chung et al. ............... 709/219

OTHER PUBLICATIONS

Haifeng Yu and Amin Vahdat (2002), Minimal Replication Cost for Availability, pp. 98-107.*

Ludmila Cherkasova, Mohan DeSouza, Shankar Ponnekanti, Improving Performance of Shared Web Hosting Service on a Web Server Cluster.*

Ludmila Cherkasova and Jangwon Lee (2003), Fast Replica: Efficient Large File Distribution within Content Delivery Networks.*

Domenico Sacca and Gio Wiederhold (1985), Database Partitioning in a Cluster of Processors, pp. 29-56.*

Byers, J. et al., "Informed Content Delivery Across Adaptive Overlay Networks," Proc. of ACM SIGCOMM, 2002, pp. 1-14.

U.S. Appl. No. 10/345,718, Cherkasova.

U.S. Appl. No. 10/345,587, Cherkasova.

U.S. Appl. No. 10/345,719, Cherkasova.

* cited by examiner

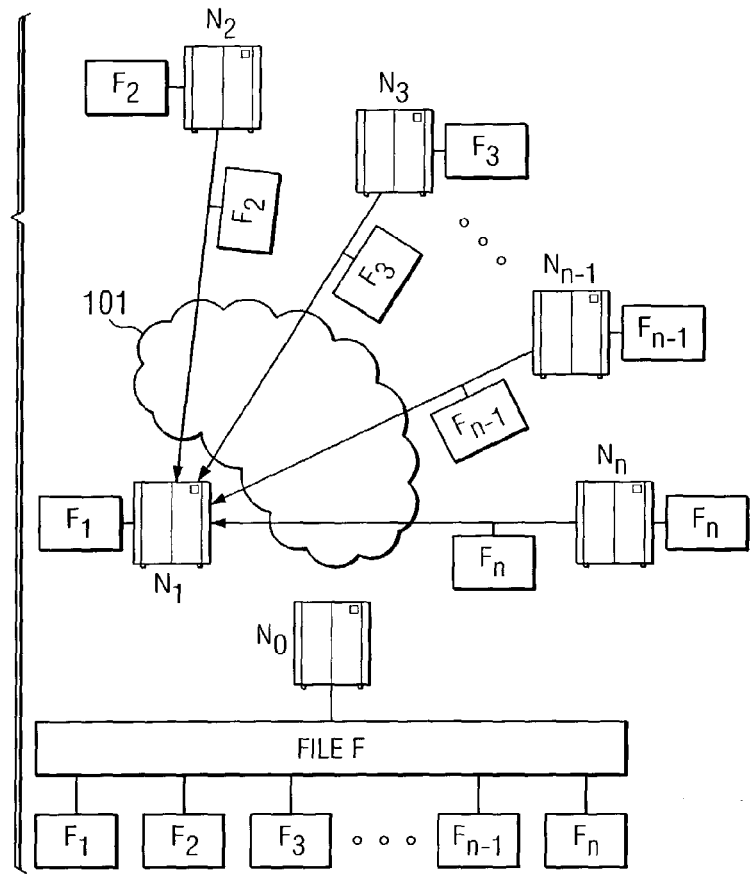
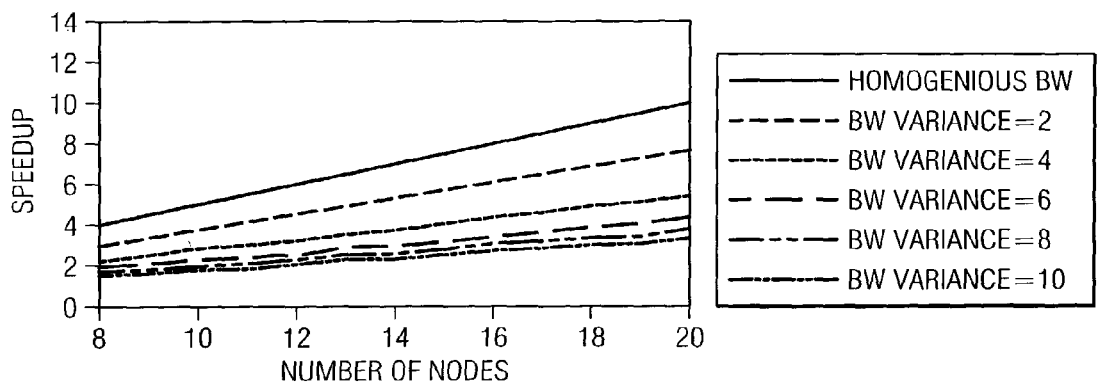

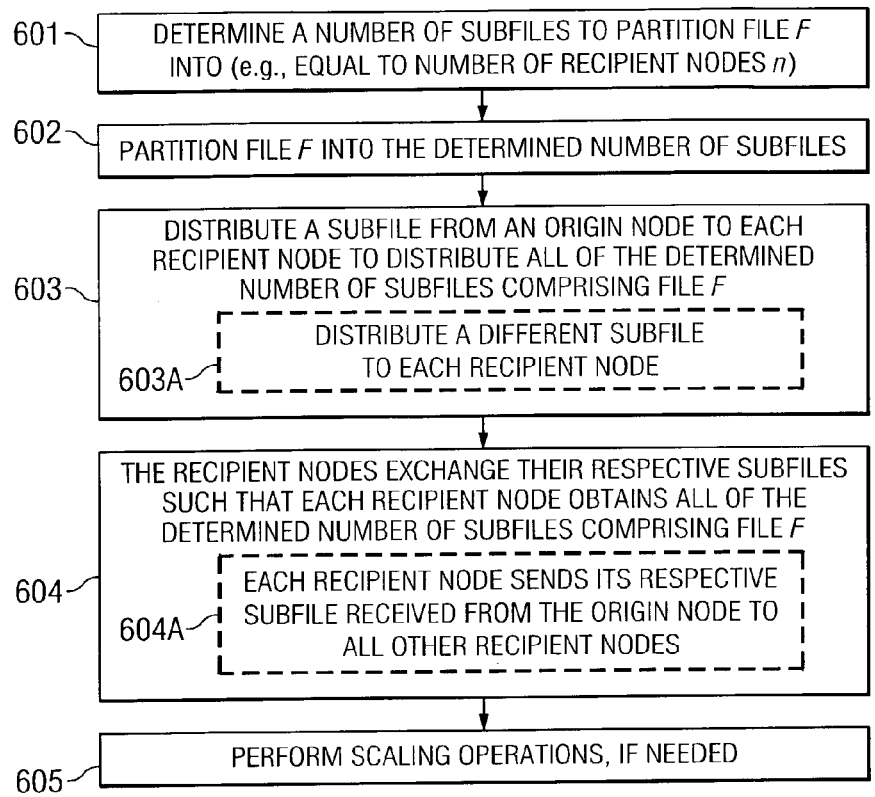
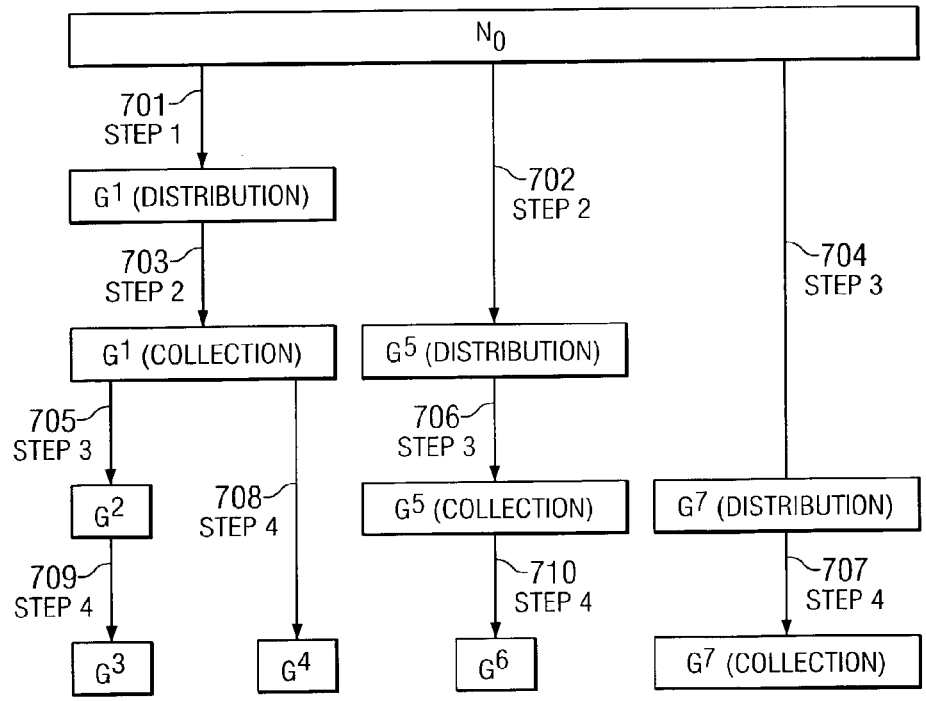

SYSTEM AND METHOD FOR EFFICIENTLY REPLICATING A FILE AMONG A PLURALITY OF RECIPIENTS

CROSS-REFERENCE TO RELATED APPLICATIONS

This application is related to commonly assigned U.S. Published Patent Application Number 2004/0143647 titled "SYSTEM AND METHOD FOR EFFICIENTLY REPLICATING A FILE AMONG A PLURALITY OF RECIPIENTS IN A RELIABLE MANNER", commonly assigned U.S. Published Patent Application Number 2004/0143576 titled "SYSTEM AND METHOD FOR EFFICIENTLY REPLICATING A FILE AMONG A PLURALITY OF RECIPIENTS HAVING IMPROVED SCALABILITY", and commonly assigned U.S. Published Patent Application Number 2004/0143595 titled "SYSTEM AND METHOD FOR EFFICIENTLY REPLICATING A FILE AMONG A PLURALITY OF RECIPIENTS HAVING IMPROVED SCALABILITY AND RELIABILITY", the disclosures of which are hereby incorporated herein by reference.

FIELD OF THE INVENTION

The present invention relates in general to file distribution, and more specifically to systems and methods for efficiently distributing a file from a first node to a plurality of recipient nodes.

DESCRIPTION OF RELATED ART

Today, much information is stored as digital data. Such information is often available to processor-based devices via client-server networks. Client-server networks are delivering a large array of information (including content and services) such as news, entertainment, personal shopping, airline reservations, rental car reservations, hotel reservations, on-line auctions, on-line banking, stock market trading, as well as many other services and types of content. Such information providers (sometimes referred to as "content providers") are making an ever-increasing amount of information available to users via client-server networks.

It is often desirable to communicate information to a plurality of different recipients. More particularly, it is often desirable to replicate a large file among a number of distributed computers. For instance, in some situations it is desirable for a plurality of distributed clients to receive a replicated file. For example, suppose a number of client computers comprise a software application program, and the application program's provider makes a modification or update to the program. The application provider may desire to distribute the software update to each of the client computers. As another example, a company may receive a new software program and desire to distribute the software program to all of its computers that are communicatively coupled to the company's Local Area Network (LAN) or Intranet.

As still another example, it may be desirable for a large file to be replicated among a plurality of distributed servers. For instance, as described further below, a plurality of distributed servers may be established for efficiently serving content to clients (e.g., each server may be responsible for a particular geographical region of clients), and it may be desirable to replicate a file from an originating server to the other distributed servers such that all of the servers provide the same content to their respective clients. For example, Content Delivery Networks (CDNs) are based on a large-scale distributed network of servers located closer to the edges of the Internet for efficient delivery of digital content, including various forms of multimedia content. The main goal of the CDN's architecture is to minimize the network impact in the critical path of content delivery as well as to overcome a server overload problem, which is a serious threat for busy sites serving popular content. CDNs implementing distributed content servers are becoming increasingly popular on the Internet, and particularly within the World Wide Web (the "web") portion of the Internet, for example, for serving content (web documents) to clients. Many edge servers may be implemented within the Internet (e.g., hundreds, thousands, or even hundreds of thousands of edge servers may be implemented) that are each to serve the same, replicated content to their respective clients.

For many web documents (e.g., html pages and images having a relatively small file size) served via CDN, active replication of the original content at the edge servers may not be needed. The CDN's edge servers act as caching servers, and if the requested content is not yet in the cache at the time it is requested by a client, the content is retrieved from the original server using the so-called pull model. The performance penalty associated with the initial document retrieval from the original server to the edge server serving the requesting client, such as higher latency observed by the client and the additional load experienced by the original server, is generally not significant for small to medium size web documents.

For large files (e.g., large documents, software download packages, and media files), a different operational mode is typically preferred. In this case, it is typically desirable to replicate these files at edge servers in advance of a client requesting them, using the so-called push model. For large files, actively replicating the files to a plurality of distributed edge servers is a challenging, resource-intensive problem, e.g., media files can require significant bandwidth and download time due to their large sizes: a 20 minute media file encoded at 1 Mbit/s results in a file of 150 Mbytes. Thus, if such a large file was not actively replicated to the edge servers in advance of a client requesting the file, a significant performance penalty may be incurred for retrieving the file from the original server, such as higher latency observed by the client and the additional load experienced by the original server in providing the large file to the edge server serving the requesting client. Sites supported for efficiency reasons by multiple mirror servers face a similar problem: the original content needs to be replicated across the multiple, geographically distributed, mirror servers.

BRIEF SUMMARY OF THE INVENTION

In accordance with one embodiment of the present invention, a method of distributing a file from a first node to a plurality of recipient nodes is provided. The method comprises partitioning a file into a plurality of subfiles, and distributing the plurality of subfiles from a first node to a first group comprising a plurality of recipient nodes, wherein at least one subfile is distributed from the first node to each recipient node of the first group but not all of the plurality of subfiles are distributed from the first node to any of the recipient nodes of the first group. The method further comprises the plurality of recipient nodes of the first group exchanging their respective subfiles such that each recipient node of the first group obtains all of the plurality of subfiles.

In accordance with another embodiment of the present invention, a system comprises a means for partitioning a file into a plurality of subfiles. The system further comprises an origin node comprising means for distributing all of the plurality of subfiles from the origin node to a first group comprising a plurality of recipient nodes, wherein at least one subfile is distributed from the origin node to each recipient node of the first group but not all of the plurality of subfiles are distributed from the origin node to any of the recipient nodes of the first group. The recipient nodes of the first group each comprise means for exchanging their respective subfiles received from the origin node such that each recipient node of the first group obtains all of the plurality of subfiles.

In accordance with another embodiment of the present invention, a system comprises an origin node operable to partition a file into a plurality of subfiles, wherein the plurality of subfiles correspond in number to a number of recipient nodes in a first group to which said file is to be distributed. The origin node is operable to distribute all of the plurality of subfiles to the recipient nodes, wherein a different subfile is distributed from the origin node to each of the recipient nodes. The recipient nodes are operable to exchange their respective subfiles received from the origin node such that each recipient node obtains all of the plurality of subfiles.

BRIEF DESCRIPTION OF THE DRAWINGS

FIG. 3 shows an example of a recipient node receiving subfiles from each of the other recipient nodes in accordance with the file distribution technique of FIG. 1;

FIG. 4A shows a graph illustrating the relative average replication time speedup under a FastReplica in the Small distribution technique of an embodiment of the present invention compared to a traditional Multiple Unicast distribution technique;

FIG. 6 shows an example operational flow diagram for distributing a file from an origin node to a plurality of recipient nodes in accordance with an embodiment of the present invention;

FIG. 7 shows an example scaling technique for a file distribution process of an embodiment of the present invention;

DETAILED DESCRIPTION

Figure 1:
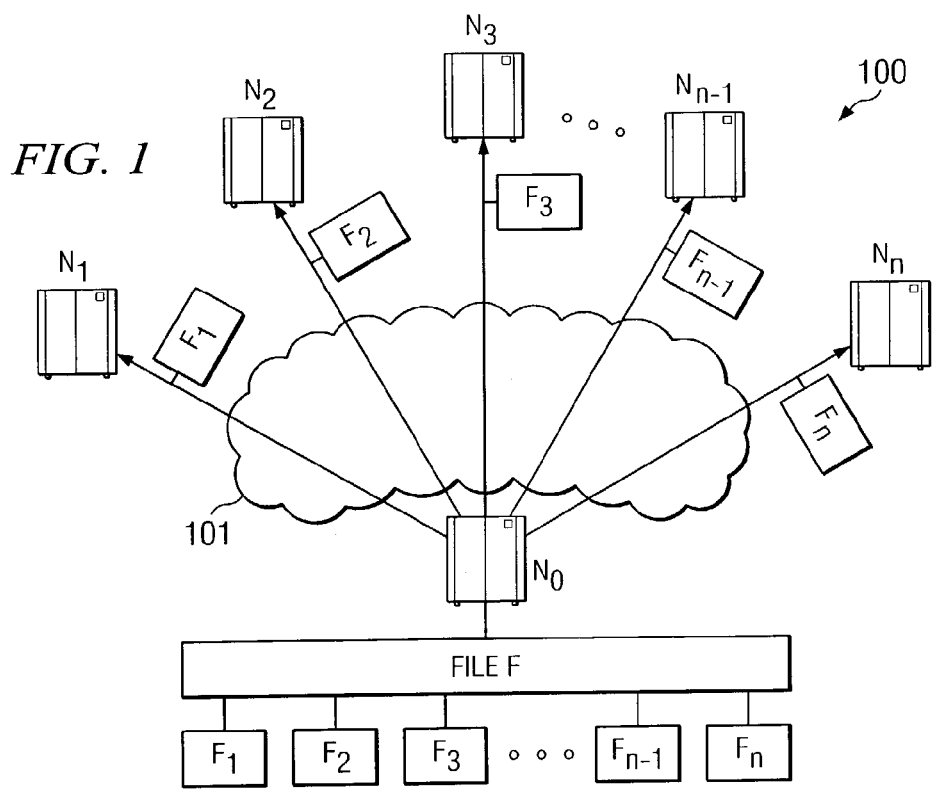
FIG. 1 shows an example environment in which embodiments of the present invention may be utilized and illustrates an example of distributing subfiles from an origin node to a plurality of recipient nodes in accordance with a file distribution technique of an embodiment of the present invention.

Various embodiments of the present invention are now described with reference to the above figures, wherein like reference numerals represent like parts throughout the several views. As described further below, embodiments of the present invention provide a system and method for distributing a file from a first node (which may be referred to herein as the "origin" node) to a plurality of recipient nodes. In certain embodiments, the plurality of recipient nodes comprise servers, such as edge servers in a CDN or mirror servers as examples. Of course, embodiments of the present invention may also be utilized for distributing a file to client nodes. According to an embodiment of the present invention, a file is partitioned into a plurality of parts (or "subfiles"), and the plurality of parts are distributed from the origin node to the recipient nodes. More particularly, all of the subfiles comprising the file to be distributed are communicated from an origin node to the recipient nodes, but the origin node does not send all of the subfiles to each recipient node. That is, the origin node sends only a portion of the subfiles that comprise the file to be distributed to each recipient node. For instance, in one embodiment, each recipient node receives a different one of the subfiles of the file to be distributed. Thereafter, the recipients exchange their respective subfiles with each other, thus resulting in each recipient obtaining the full file. Accordingly, the origin node is not required to communicate the full file to each recipient node, but rather may communicate only a portion thereof to each recipient node, and the recipient nodes then exchange their respective portions to result in each recipient node obtaining all subfiles comprising the full file.

Various techniques may be implemented for distributing a file from an origin node to a plurality of recipient nodes in the manner described above. One embodiment of the present invention implements a technique referred to herein as the FastReplica distribution technique. With FastReplica, to replicate a large file among a group of n recipient nodes, the original file F is partitioned into n subfiles of approximately equal size and each subfile is transferred from the origin node to a different node in the recipient group. That is, the subfiles are communicated to the recipient nodes from the origin node concurrently. Such transfer of the subfiles from the origin node to the recipient nodes is referred to herein as a "distribution" step. Thereafter, each recipient node propagates its respective subfile (i.e., the subfile that it received from the origin node) to the remaining recipient nodes in the group. That is, each recipient node concurrently communicates its subfile to the other nodes of the group. This exchange of subfiles by recipient nodes is referred to herein as a "collection" step, as the recipient nodes each collect the subfiles comprising file F from the other recipient nodes. Thus, instead of typical replication of the entire file to n nodes by using n communication paths (e.g., Internet paths) connecting the origin node to the replication group, this FastReplica technique exploits n×n communication paths within the replication group where each path is used for transferring the $$\frac{1}{n}\text{-th}$$

portion of the file.

To better appreciate aspects of embodiments of the present invention, it is appropriate to briefly review the existing techniques in the art for file distribution. Currently, the three most popular methods used for content distribution (or file "replication") in the Internet environment are: (1) satellite distribution, (2) multicast distribution, and (3) application-level multicast distribution.

With satellite distribution, the content distribution server (or the "origin node") has a transmitting antenna. The servers (or "recipient nodes") to which the content should be replicated (or the corresponding Internet Data centers, where the servers are located) have a satellite receiving dish. The original content distribution server broadcasts a file via a satellite channel. Among the shortcomings of the satellite distribution method are that it requires special hardware deployment and the supporting infrastructure (or service) is quite expensive.

With multicast distribution, an application can send one copy of each packet of a file and address it to the group of recipient nodes (IP addresses) that want to receive it. This technique reduces network traffic by simultaneously delivering a single stream of information to hundreds/thousands of interested recipients. Multicast can be implemented at both the data-link layer and the network layer. Applications that take advantage of multicast technologies include video conferencing, corporate communications, distance learning, and distribution of software, stock quotes, and news. Among the shortcomings of the multicast distribution method is that it requires a multicast support in routers, which still is not consistently available across the Internet infrastructure.

Since the native IP multicast has not received widespread deployment, many industrial and research efforts have shifted to investigating and deploying the application level multicast, where nodes across the Internet act as intermediate routers to efficiently distribute content along a predefined mesh or tree. A growing number of researchers have advocated this alternative approach, where all multicast related functionality, including group management and packet replication, is implemented at end systems. In this architecture, nodes participating in the multicast group self-organize themselves into a scalable overlay structure using a distributed protocol. Further, the nodes attempt to optimize the efficiency of the overlay by adapting to changing network conditions and considering the application-level requirements.

An extension for the end-system multicast is introduced by J. Byers, J. Considine, and M. Mitzenmacher in "Informed Content Delivery Across Adaptive Overlay Networks", *Proc. Of ACM SIGCOMM,* 2002, in which instead of using the end systems as routers forwarding the packets, the authors propose that the end-systems actively collaborate in an informed manner to improve the performance of large file distribution. The main idea is to overcome the limitation of the traditional service models based on tree topologies where the transfer rate to the client is defined by the bandwidth of the bottleneck link of the communication path from the origin server. The authors propose to use additional cross-connections between the end-systems to exchange the complementary content these nodes have already received. Assuming that any given pair of end-systems has not received exactly the same content, these cross-connections between the end-systems can be used to "reconcile" the differences in received content in order to reduce the total transfer time.

As mentioned above, embodiments of the present invention may implement a distribution technique referred to herein as the FastReplica distribution technique. Example embodiments implementing such FastReplica technique are described further below. Consider the following notations:

(a) Let $N_0$ be a node (which may be referred to as an "origin node" or "origin server") which has an original file F, and let Size(F) denote the size of file F in bytes; and (b) Let $R=\{N_1, \ldots, N_n\}$ be a replication set of nodes (i.e., a set of recipient nodes to which the file F is to be distributed).

The problem becomes replicating file F across nodes $N_1, \ldots, N_n$, while minimizing the overall replication time. In one embodiment, a relatively small group of recipient nodes $N_1, \ldots, N_n$ exist (e.g., a sufficiently small number of recipient nodes such that each node $N_0, \ldots, N_n$ can support concurrent communication connections to all of the other n−1 nodes, which is typically 30 or less recipient nodes). The FastReplica technique may be implemented for application to a relatively small number n (e.g., approximately 30 or less) of recipient nodes, wherein such an implementation may be referred to herein as "FastReplica in the Small." In this FastReplica in the Small technique, file F is divided into n equal subsequent subfiles: $F_1, \ldots, F_n$, where $$Size(F_i) = \frac{Size(F)}{n}$$

bytes for each i: $1 \leq i \leq n$.

The FastReplica in the Small algorithm then performs a distribution step in which origin node $N_0$ opens n concurrent network connections to nodes $N_1, \ldots, N_n$, and sends to each recipient node $N_i (1 \leq i \leq n)$ the following items:

(a) a distribution list of nodes $R=\{N_1, \ldots, N_n\}$ to which subfile $F_i$ is to be sent in the next step (each node $N_i$ is itself excluded from its distribution list); and (b) subfile $F_i$.

An example of this distribution step of the FastReplica algorithm is shown in FIG. 1. For instance, FIG. 1 shows an example environment 100 in which embodiments of the present invention may be utilized. Environment 100 comprises origin node $N_0$ and recipient nodes $N_1, N_2, N_3, \ldots, N_{n-1}, N_n$ that are communicatively coupled via communication network 101. Communication network 101 is preferably a packet-switched network, and in various implementations may comprise, as examples, the Internet or other Wide Area Network (WAN), an Intranet, Local Area Network (LAN), wireless network, Public (or private) Switched Telephony Network (PSTN), a combination of the above, or any other communications network now known or later developed within the networking arts that permits two or more computing devices to communicate with each other. In certain embodiments, nodes $N_0$–$N_n$ comprise server computers. For instance, nodes $N_1, \ldots, N_n$ may comprise edge servers in a CDN or mirror servers within a mirrored network. In other embodiments, nodes $N_0$–$N_n$ may comprise server and/or client computers. For example, node $N_0$ may comprise a server computer, and nodes $N_1, \ldots, N_n$ may comprise client computers to receive a file (e.g., software application file, etc.) from node $N_0$.

Origin node $N_0$ comprises file F stored thereto, and such file F is partitioned into n subfiles $F_1, F_2, F_3, \ldots, F_{n-1}, F_n$, wherein the sum of subfiles $F_1, F_2, F_3, \ldots, F_{n-1}, F_n$ comprise the total file F. As shown, the plurality of subfiles are distributed from origin node $N_0$ to the recipient nodes $N_1, \ldots, N_n$. More particularly, all of the n subfiles comprising file F are communicated from origin node $N_0$ to the recipient nodes $N_1, \ldots, N_n$, but origin node $N_0$ does not send all of the n subfiles to each recipient node. That is, origin node $N_0$ sends only a portion of the n subfiles to each recipient node. For instance, in this example, each recipient node receives a different one of the n subfiles from origin node $N_0$. More particularly, origin node $N_0$ communicates subfile $F_1$ to node $N_1$, subfile $F_2$ to node $N_2$, subfile $F_3$ to node $N_3, \ldots$, subfile $F_{n-1}$ to node $N_{n-1}$, and subfile $F_n$ to node $N_n$ via communication network 101. Additionally, in an embodiment of the present invention, origin node $N_0$ also sends a distribution list to each recipient node $N_1, \ldots, N_n$. The distribution list for each node identifies the other recipient nodes that such recipient node is to communicate the subfile that it received from origin node $N_0$. For example, origin node $N_0$ may send to node $N_1$ a distribution list identifying nodes $N_2, \ldots, N_n$. Similarly, origin node $N_0$ may send to node $N_2$ a distribution list identifying nodes $N_1$, and $N_3, \ldots, N_n$, and so on.

Figure 2:
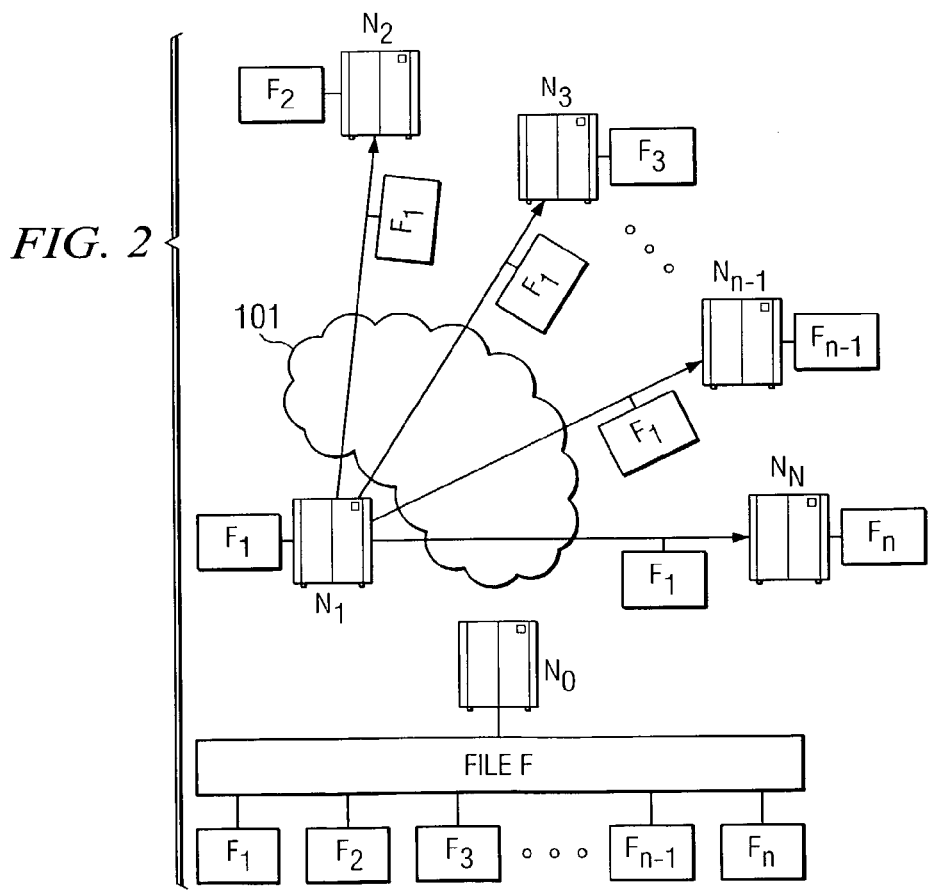
FIG. 2 shows an example of a recipient node communicating the subfile that it received from an origin node to other recipient nodes in accordance with the file distribution technique of FIG. 1.

The next step of the FastReplica algorithm is referred to herein as the collection step. An example of the collection step is described herein in conjunction with FIGS. 2 and 3. After receiving file $F_i$, node $N_i$ opens (n−1) concurrent network connections to remaining nodes in the recipient group and sends subfile $F_i$ to them, as shown in FIG. 2 for node $N_1$. More particularly, FIG. 2 shows that node $N_1$ opens n−1 concurrent network connections, i.e., one network connection with each of recipient nodes $N_2, \ldots, N_n$. Node $N_1$ communicates subfile $F_1$, which it received from origin node $N_0$ in the above-described distribution step, to each of the recipient nodes $N_2, \ldots, N_n$.

Similarly, FIG. 3 shows the set of incoming, concurrent connections to node $N_1$ from the remaining recipient nodes $N_2, \ldots, N_n$, transferring the complementary subfiles $F_2, \ldots, F_n$ during the collection step of the FastReplica algorithm. More particularly, FIG. 3 shows that node $N_1$ has n−1 concurrent network connections, i.e., one network connection with each of recipient nodes $N_2, \ldots, N_n$ through which node $N_1$ receives the other subfiles comprising file F from the recipient nodes $N_2, \ldots, N_n$. That is, each of recipient nodes $N_2, \ldots, N_n$ communicates its respective subfile that it received from origin node $N_0$ in the above-described distribution step to node $N_1$.

Thus at the end of this collection step, each node $N_i$ has the following set of network connections:
(a) there are n−1 outgoing connections from node $N_i$: one connection to each node $N_k$ ($k \neq i$) for sending the corresponding subfile $F_i$ to node $N_k$; and
(b) there are n−1 incoming connections to node $N_i$: one connection from each node $N_k$ ($k \neq i$) for sending the corresponding subfile $F_k$ to node $N_i$.

Thus, at the end of this collection step, each recipient node receives all subfiles $F_1, \ldots, F_n$ comprising the entire original file F. Accordingly, each of the nodes in the replication set R obtain the full file F (which is reconstructed through the received subfiles).

In view of the above, it should be recognized that instead of the typical replication of an entire file to n nodes by using n communication paths connecting the origin node $N_0$ to the replication group, the example FastReplica algorithm described above exploits n×n different communication paths within the replication group wherein each path is used for transferring $$\frac{1}{n}\text{-th}$$

of the file F. Thus, the impact of congestion on any particular communication path participating in the schema is limited for a transfer of $$\frac{1}{n}\text{-th}$$

of the file F. Additionally, the example FastReplica algorithm described above takes advantage of both the upload and download bandwidth of the recipient nodes. Typical servers in CDN environments have symmetrical upload and download bandwidth to be able to utilize this feature. The efficiency of the FastReplica algorithm for various types of bandwidths that may be available between the nodes is addressed further below.

The above-described FastReplica distribution technique enables efficient distribution of a file F (and particularly a large file) to a plurality of recipient nodes. Consider the following performance analysis of the above-described FastReplica distribution technique. Let $Time^i(F)$ denote the transfer time of file F from the original node $N_0$ to node $N_i$ as measured at node $N_i$. The terms transfer time and replication time are used interchangeably herein. Below, we consider the following two performance metrics:

(a) Average replication time:

$$Time_{aver} = \frac{1}{n}\sum_{i=1}^{n} Time^i(F); \text{ and}$$

(b) Maximum replication time:

$$Time_{max} = \max\{Time^i(F)\}, i \in \{1, \ldots, n\}.$$

$Time_{max}$ reflects the time when all of the nodes in the replication set receive a copy of the original file. It is generally desirable to minimize the maximum replication time. However, understanding the impact of the FastReplica technique on the average replication time $Time_{aver}$ may also be of interest.

First, consider an idealistic setting, where nodes $N_1, \ldots, N_n$ have symmetrical (or nearly symmetrical) incoming and outgoing bandwidth, which is typical for CDNs, distributed Internet Data Centers (IDCs), and distributed enterprise environments, as examples. In addition, let nodes $N_0, N_1, \ldots, N_n$ be homogeneous, and each node can support k network connections to other nodes at B bytes per second on average. In this idealistic setting, there is no difference between maximum and average replication times using the above-described FastReplica technique. Using the assumption on homogeneity of nodes' bandwidth, the transfer time for each concurrent connection i ($1 \leq i \leq n$) during the distribution step can be estimated as:

$$Time_{distr} = \frac{Size(F)}{n \times B}.$$

The transfer time at the collection step is similar to the time encountered at the first (distribution) step:

$$Time_{collect} = \frac{Size(F)}{n \times B}.$$

Thus, the overall replication time under the example FastReplica in the small algorithm described above is the following:

$$Time_{FR}^{small} = Time_{distr} + Time_{collect} = 2 \times \frac{Size(F)}{n \times B}.$$

Now, let Multiple Unicast denote a traditional file distribution schema that transfers the entire file F from the origin node $N_0$ to nodes $N_1, \ldots, N_n$ by simultaneously using n concurrent network connections. The overall transfer time under Multiple Unicast is the following:

$$Time_{MU}^{small} = \frac{Size(F)}{B}.$$

Thus, in an idealistic setting, FastReplica in the small provides the following speedup of file replication time compared to the traditional Multiple Unicast strategy:

$$Replication\_Time\_Speedup = \frac{Time_{FR}^{small}}{Time_{MU}^{small}} = \frac{n}{2}.$$

While the comparison of FastReplica and Multiple Unicast in the idealistic environment provides insight into why the FastReplica algorithm may provide significant performance benefits for replication of large files, the bandwidth connections in the realistic setting could be very different from the idealistic assumptions identified above. Due to changing network conditions, even the same link might have a different available bandwidth when measured at different times. Accordingly, below is an analysis of how the example FastReplica algorithm described above performs when network paths participating in the transfers have a different available bandwidth.

Let BW denote a bandwidth matrix, where BW[i][j] reflects the available bandwidth of the communication path from node $N_i$ to node $N_j$ in the replication set as measured at some time T, and let Var (or "bandwidth variance") be the ratio of maximum to minimum available bandwidth along the communication paths participating in the file transfers. For the below analysis, suppose the bandwidth matrix BW is populated in the following way:
BW[i][j]=B×random(1,Var), where function random(1,Var) returns a random integer var: $1 \leq var \leq Var$.

While this provides a relatively simplistic model, it helps to reflect a realistic situation, where the available bandwidth of different links can be significantly different. To perform a sensitivity analysis of how the FastReplica performance depends on a bandwidth variance of participating paths, a range of different values for Var between 1 and 10 have been used in my initial experiments. When Var=1, it is the idealistic setting discussed above, wherein all of the communication paths are homogeneous and have the same bandwidth B (i.e., no variance in bandwidth). When Var=10, the network paths between the nodes have highly variable available bandwidth with a possible difference of up to 10 times.

Using the bandwidth matrix BW, the average and maximum file replication times have been computed under the FastReplica and Multiple Unicast methods for a different number of nodes in the replication set, and the relative speedup of the file replication time under the FastReplica technique compared to the replication time under the Multiple Unicast strategy has been derived. For each value of Var, the experiments have been repeated multiple times, where the bandwidth matrix BW is populated by using the random number generator with different seeds.

FIG. 4A shows a graph illustrating the relative average replication time speedup under FastReplica in the Small compared to Multiple Unicast as recognized through the above experiments. For Var=2, the average replication time for 8 nodes under FastReplica is 3 times better compared to Multiple Unicast, and for 20 nodes, it is 8 times better. While the performance benefits of FastReplica over Multiple Unicast decrease for higher variance bandwidth of participating paths, the FastReplica technique still remains quite efficient, with performance benefits converging to a practically fixed ratio for Var>4.

Figure 4B:
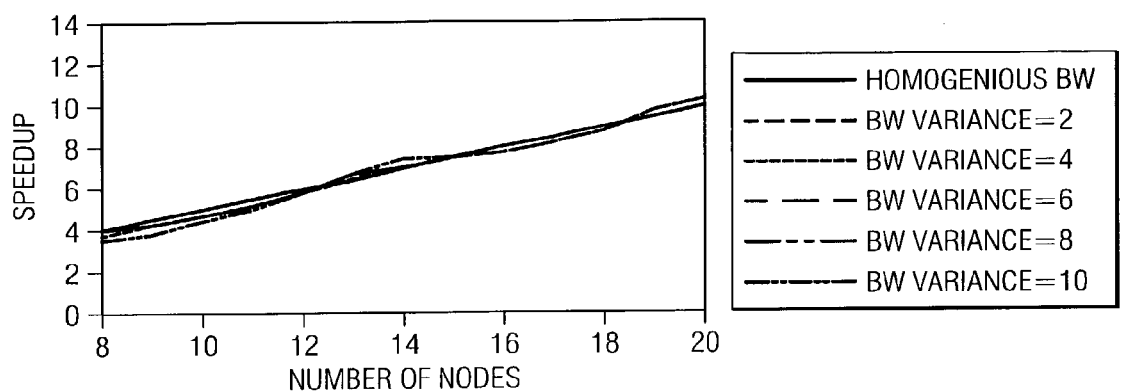
FIG. 4B shows a graph illustrating the relative maximum replication time speedup under the FastReplica in the small distribution technique compared to the traditional Multiple Unicast distribution technique.

FIG. 4B shows a graph illustrating the relative maximum replication time speedup under FastReplica in the small compared to Multiple Unicast as recognized through the above experiments. It should be observed that, independent of the values of bandwidth variance, the maximum replication time under FastReplica for n nodes is $$\frac{n}{2}$$

times better compared to the maximum replication time under Multiple Unicast.

Figure 5:
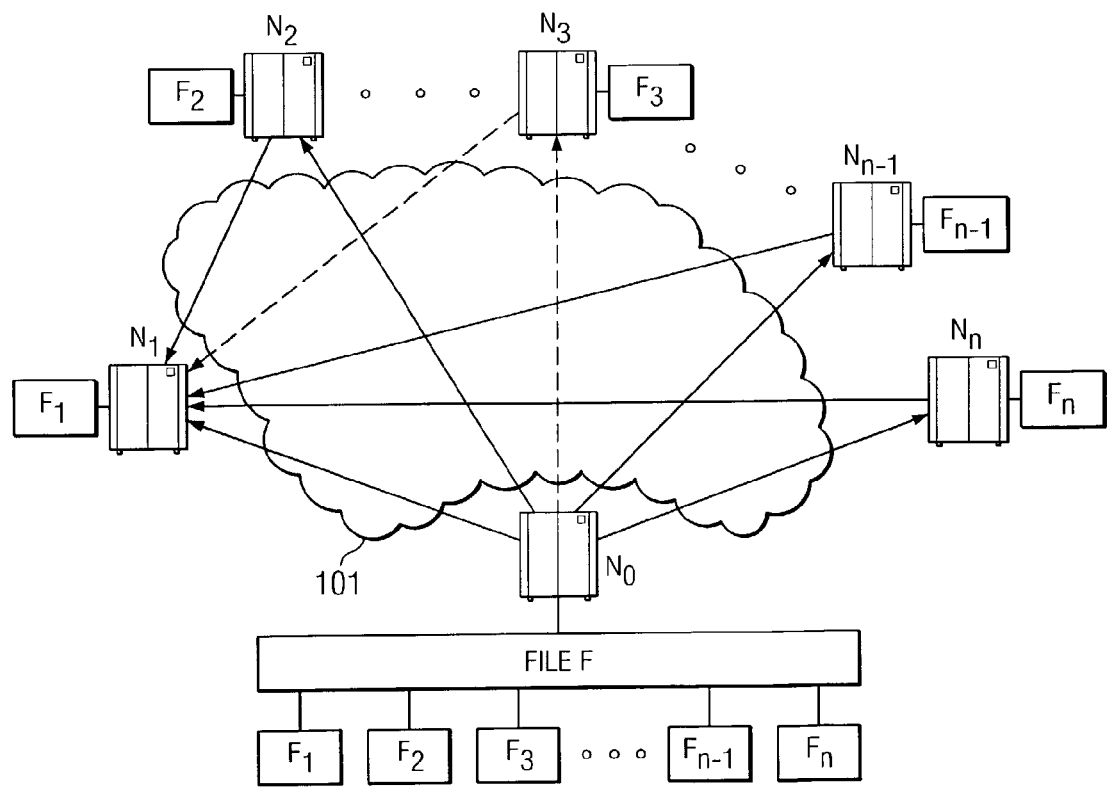
FIG. 5 shows the communication paths participating in the file distribution from origin node $N_0$ to a recipient node $N_1$ under the FastReplica algorithm of an embodiment of the present invention.

The above can be explained the following way:
(a) Multiple Unicast: The maximum replication time is defined by the entire file transfer time over the path with the worst available bandwidth among the paths connecting $N_0$ and $N_i$, $1 \leq i \leq n$; and
(b) FastReplica: FIG. 5 shows the set of paths participating in the file transfer from node $N_0$ to node $N_1$ under the FastReplica algorithm (with node $N_1$ shown as a representative of the recipient nodes). As shown in FIG. 5, origin node $N_0$ communicates subfiles $F_1, F_2, F_3, \ldots, F_{n-1}, F_n$ to recipient nodes $N_1, N_2, N_3, \ldots, N_{n-1}, N_n$ respectively, via concurrent communication paths (in the distribution step). And, in the collection step, node $N_1$ receives subfiles $F_2, F_3, \ldots, F_{n-1}, F_n$ from recipient nodes $N_2, N_3, \ldots, N_{n-1}, N_n$ respectively, via concurrent communication paths. Of course, also in the collection step, node $N_1$ may simultaneously have n−1 concurrent communication paths established with recipient nodes $N_2, N_3, \ldots, N_{n-1}, N_n$ for communicating subfile $F_1$ to those recipient nodes (not shown in FIG. 5 for simplicity). Additionally, each of the recipient nodes $N_1, N_2, N_3, \ldots, N_{n-1}, N_n$ may have n−1 concurrent communication paths established with the other remaining recipient nodes for communicating its respective subfile received from origin node $N_0$ to the remaining recipient nodes, and each of the recipient nodes $N_1, N_2, N_3, \ldots, N_{n-1}, N_n$ may simultaneously have n−1 concurrent communication paths established with the other remaining recipient nodes for receiving subfiles from those remaining recipient nodes.

The replication time observed at node $N_1$ in the above example is defined by the maximum transfer time of $$\frac{1}{n}\text{-th}$$

of file F over either:
(a) the communication path from $N_0$ to $N_1$, or
(b) the communication path with the worst overall available bandwidth consisting of two communication subpaths: (1) the subpath from $N_0$ to $N_j$ and (2) the subpath from $N_j$ to $N_1$, for some j: $1 \leq j \leq n$.

In a worst case scenario, both communication subpaths identified above have a minimal bandwidth in the considered model, and since each path is used for transferring $$\frac{1}{n}\text{-th}$$

of the entire file, this would lead to $$\frac{n}{2}$$

times latency improvement under FastReplica compared to the maximum replication time under the traditional Multiple Unicast technique.

Now, further consider an artificial example, which aims to provide additional insight into the possible performance outcomes under the example FastReplica distribution technique described above. Let $N_0$ be the origin node, and $N_1, \ldots, N_{10}$ be the recipient nodes, and the bandwidth between the nodes be defined by the following matrix:

$$BW(i,j) = \begin{cases} \frac{1}{10} \times B & \text{if } i=0, j=1 \\ B & \text{if } i=0, 2 \leq j \leq 10 \\ \frac{1}{10} \times B & \text{if } 1 \leq i, j \leq 10 \end{cases}$$

In other words, the origin node $N_0$ has a limited bandwidth of $$\frac{1}{10} \times B$$

to node $N_1$, while the bandwidth from $N_0$ to the rest of the recipient nodes $N_2, \ldots, N_{10}$ is equal to B. In addition, the cross-bandwidth between the nodes $N_1, \ldots, N_{10}$ is also very limited, such that any pair $N_i$ and $N_j$ is connected via a communication path with available bandwidth of $$\frac{1}{10} \times B.$$

Initially, it may seem that the FastReplica technique might perform badly in this configuration because the additional cross-bandwidth between the recipient nodes $N_1, \ldots, N_{10}$ is so poor relative to the bandwidth available between the origin node $N_0$ and the recipient nodes $N_2, \ldots, N_{10}$. The average and maximum replication times for this configuration under the Multiple Unicast and FastReplica strategies are computed below:
(a) Multiple Unicast:

$$Time_{aver} = \frac{19 \times Size(F)}{10 \times B}, Time_{max} = \frac{10 \times Size(F)}{B}; \text{ and}$$

(b) FastReplica:

$$Time_{aver} = \frac{191 \times Size(F)}{100 \times B}, Time_{max} = \frac{2 \times Size(F)}{B}.$$

As can be seen from the above computations, the maximum replication time ($Time_{max}$) in this configuration is 5 times better under the example FastReplica technique than under the Multiple Unicast strategy. In the above-described FastReplica technique, any communication path between the nodes is used to transfer only $$\frac{1}{n}\text{-th}$$

of the entire file. Thus, the communication paths with poor bandwidth are used for much shorter transfers, which leads to a significant improvement in maximum replication time. However, the average replication time in this example is not improved under FastReplica compared to Multiple Unicast. The reason for this is that the high bandwidth communication paths in this configuration are used similarly: to transfer only $$\frac{1}{n}\text{-th}$$

of the entire file, and during the collection step of the FastReplica algorithm, the transfers of complementary $$\frac{1}{n}\text{-th}$$

size subfiles within the replication group are performed over poor bandwidth paths. Thus, in certain cases, like that considered above, FastReplica may provide significant improvements in maximum replication time, but may not improve the average replication time over the traditional Multiple Unicast technique.

The analysis considered above outlines the conditions under which FastReplica is expected to perform well, providing the essential performance benefits. Similar reasoning can be applied to derive the situations when FastReplica might be inefficient. For example, if there is a node $N_K$ in the replication set such that most of the communication paths between node $N_K$ and the rest of the recipient nodes have a very limited available bandwidth (say, n−1 times worse than the minimal available bandwidth of the paths connecting $N_0$ and $N_i$, $1 \leq i \leq n$) then the performance of FastReplica during the second (collection) step is impacted by the poor bandwidth of the paths between $N_K$ and $N_i$, $1 \leq i \leq n$, and FastReplica will not provide expected performance benefits.

In view of the above, to apply FastReplica efficiently, the preliminary bandwidth estimates are useful. That is, the expected bandwidth estimates for a given environment may be used to estimate the benefit of using the FastReplica technique for distributing a file. In certain embodiments, such bandwidth estimates for an environment may be used to determine whether to use the FastReplica technique for distributing a file F to recipient nodes in the environment or whether to use another distribution technique. These bandwidth estimates are also useful for correct clustering of the appropriate nodes into the replication subgroups when scaling (e.g., for FastReplica in the Large), as discussed further below.

FIG. 6 shows an example operational flow diagram for distributing a file from an origin node to a plurality of recipient nodes in accordance with an embodiment of the present invention. In operational block 601, a number of subfiles into which file F is to be partitioned is determined. For instance, as shown in the example of FIGS. 1–3 above, in certain embodiments a FastReplica technique may be implemented in which file F may be partitioned into a number of subfiles corresponding to the number of recipient nodes n of a group to which the file F is to be distributed (if the number n of recipient nodes is sufficiently small such that each node $N_0, \ldots, N_n$ can support concurrent communication connections to all of the other n−1 nodes). In other implementations, the file F may be partitioned into a number of subfiles corresponding to the number k of concurrent communication connections that can be supported by each of the nodes $N_0, \ldots, N_n$ (wherein if k is less than the total number of recipient nodes n, then the distribution technique may be scaled for distribution to a plurality of groups of recipient nodes as described further below). In operational block 602, file F is partitioned into the determined number of subfiles.

In operational block 603, a subfile is distributed from an origin node to each recipient node, wherein all of the subfiles comprising file F are distributed to the recipient nodes. As shown, in certain embodiments block 603 may comprise operational block 603A, wherein a different subfile is distributed to each recipient node within the distribution group, as in the example of FIGS. 1–3 above in which the FastReplica technique is implemented. That is, each recipient node may receive a unique subfile from the origin node that is not received by any of the other recipient nodes within the distribution group.

In operational block 604, the recipient nodes exchange their respective subfiles such that each recipient node obtains all of the determined number of subfiles comprising file F. As shown, in certain embodiments block 604 may comprise operational block 604A wherein each recipient node sends its respective subfile received from the origin node to all other recipient nodes, as in the above-described FastReplica implementation.

In operational block 605, scaling operations may be performed, if needed. That is, if the number of recipient nodes is sufficiently large, the distribution process may be scaled to enable distribution to such a large number of recipient nodes. For instance, the distribution technique may be scaled to allow for a file distribution to hundreds, thousands, or tens of thousands, of recipient nodes, for example. More particularly, if it is determined that the number k of concurrent communication connections that can be supported by each of the nodes $N_0, \ldots, N_n$ is less than the total number of recipient nodes n, then the distribution technique may be scaled for distribution to a plurality of groups of recipient nodes as described further below. Various suitable scaling techniques may be utilized. One scaling technique that may be utilized in certain embodiments is described further in commonly assigned U.S. Published Patent Application Number 2004/0143576 titled "SYSTEM AND METHOD FOR EFFICIENTLY REPLICATING A FILE AMONG A PLURALITY OF RECIPIENTS HAVING IMPROVED SCALABILITY", the disclosure of which is hereby incorporated herein by reference.

Another scaling technique that may be implemented for certain embodiments of the present invention is described below in conjunction with FIGS. 7–10. According to one scaling technique, the above-described FastReplica in the Small distribution strategy is generalized to a case in which a set of nodes to which file F is to be distributed is very large (e.g., hundreds, thousands, tens of thousands, or more of such recipient nodes). According to one example scaling technique, let k be a number of network connections chosen for concurrent transfers between a single node and multiple recipient nodes (i.e., k limits the number of nodes in the group for Multiple Unicast or FastReplica strategies). An appropriate value of k can be experimentally determined for a given environment via probing, for example. Heterogeneous nodes might be capable of supporting a different number of connections, in which case the value of k may be a number of connections suitable for most of the nodes in the overall replication set.

File F is divided in k equal subsequent subfiles: $F_1, \ldots, F_k$, where $$Size(F_i) = \frac{Size(F)}{k}$$

bytes for each $1 \leq i \leq k$. This example scaling technique is described in conjunction with FIG. 7 in which $G^1, G^2, \ldots, G^7$ are used to denote the replication groups of nodes, each group having k nodes. The boxes in the example of FIG. 7 reflect the node or group of nodes involved in the communications on a particular logical step of the algorithm. FIG. 7 provides an example in which 4 logical steps are performed in the scaled distribution process, but as will be recognized from the description of such scaled distribution process any other number of logical steps may be appropriate in other implementations (depending on the number of nodes to which the file F is being distributed).

First, in the example of FIG. 7, origin node $N_0$ opens k concurrent network connections to nodes $N_1^1, \ldots, N_k^1$ of group $G^1$, and sends subfile $F_i$ to the corresponding recipient node $N_i^1$ ($1 \leq i \leq k$). This first step is represented by communication path(s) 701 to box $G^j$(distribution) in FIG. 7 and is similar to the distribution step of FastReplica in the Small described above.

In the second step of this example scaled distribution algorithm:

(a) In group $G^1$, each node $N_i^1$ sends its subfile $F_i$ to the rest of the nodes in group $G^1$. In this way, at the end of this step, each node in group $G^1$ has all subfiles $F_1, \ldots, F_k$ of original file F. This step is represented by communication path(s) 703 to box $G^1$ (collection) in FIG. 7 and is similar to the collection step of FastReplica in the Small described above. It should be noted that the activities performed in this second step are not synchronized between the different nodes of group $G^1$. Rather, Node $N_i^1$ starts transferring its subfile F to the remaining nodes of group $G^1$ independently of the similar step performed by the other nodes. This distributed nature of the FastReplica algorithm makes it more efficient. Thus, during the same physical time, the nodes in the group can perform different logical steps of the algorithm. For example, while some of the nodes of $G^1$ might be still finishing step 2 of the algorithm, some of the "faster" nodes of $G^1$ might start transfers related to step 3 of the algorithm (described below).

(b) In the same logical step (step 2), originator node $N_0$ opens k concurrent network connections to nodes $N_1^5, \ldots, N_k^5$ of group $G^5$, and using these i connections, it sends subfile $F_i$ to the corresponding recipient node $N_1^5$ in group $G^5$ $1 \leq i \leq k$. This step is represented by communication path(s) 702 to box $G^5$(distribution) in FIG. 7.

Figure 8:
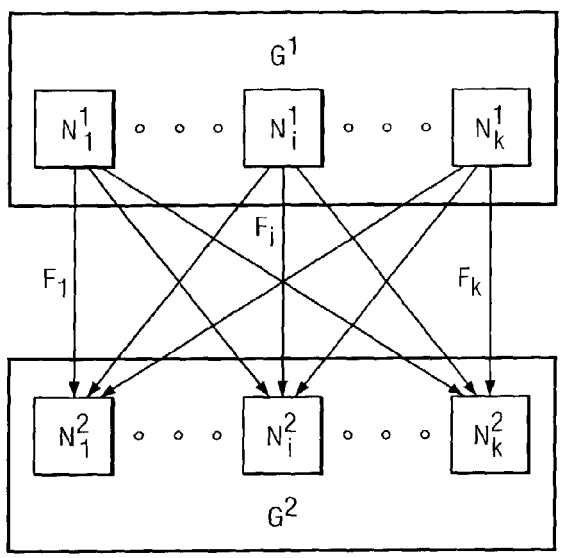
FIG. 8 shows communication paths between two groups of nodes in the distribution process of FIG. 7.
Figure 9:
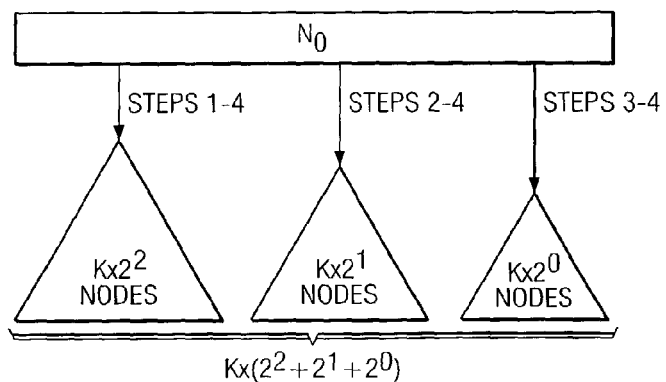
FIG. 9 shows a graphical representation of the number of recipient nodes to which a file F can be replicated in 4 logical steps in accordance with the scalable file distribution process of FIG. 7.

The above communications at steps 1 and 2 are similar to the communications defined in the example FastReplica in the Small algorithm described above. In step 3 of this example scaled distribution algorithm, the communications between groups $G^1$ and $G^2$ follow a different file exchange protocol defining another typical communication pattern actively used in the general FastReplica algorithm. Step 3 of FIG. 7 may be referred to herein as a general step, and includes the following operations:

(a) Each node $N_i^1$ of group $G^1$ opens k concurrent network connections to all k nodes of group $G^2$ for transferring its subfile $F_i$. In this way, at the end of this step, each node of group $G^2$ has all subfiles $F_1, \ldots, F_k$ of original file F. This step is represented by communication path(s) 705 to box $G^2$ in FIG. 7. The communications between the nodes in groups $G^1$ and $G^2$ are shown in more detail in FIG. 8. Turning briefly to FIG. 8, it can be seen that node $N_1^1$ of group $G^1$ distributes the subfile that it originally received from origin node $N_0$ (i.e., subfile $F_1$) to each of nodes $N_1^2, \ldots, N_k^2$ of group $G^2$ via concurrent communication connections therewith. Similarly, node $N_i^1$ of group $G^1$ distributes the subfile that it originally received from origin node $N_0$ (i.e., subfile $F_i$) to each of nodes $N_1^2, \ldots, N_k^1$ of group $G^2$ via concurrent communication connections therewith. Likewise, node $N_k^1$ of group $G^1$ distributes the subfile that it originally received from origin node $N_0$ (i.e., subfile $F_k$) to each of nodes $N_1^2, \ldots, N_k^2$ of group $G^2$ via concurrent communication connections therewith. Because of the manner in which each node $N_i^1$ of group $G^1$ opens k concurrent network connections to all k nodes of group $G^2$ for transferring its subfile $F_i$, this scaled distribution technique may be referred to as a "group-to-group" distribution technique. That is, because the nodes of a first group each communicate the respective subfile that they received from origin node $N_0$ to each of the nodes of a second group, the file is distributed directly from the first group to the second group without requiring exchange of information between the nodes of the second group.

(b) Also in logical step 3 of FIG. 7, in group $G^5$, each node $N_i^5$ sends its subfile $F_i$ to the rest of the nodes in the group. In this way, at the end of this step, each node in group $G^5$ has all subfiles $F_1, \ldots, F_k$ of original file F. This step is represented by communication path(s) 706 to box $G^5$(collection) in FIG. 7.

(c) At the same logical step 3 of FIG. 7, origin node $N_0$ opens k concurrent network connections to nodes $N_1^7, \ldots, N_k^7$ of group $G^7$, and using i connection, it sends the subfile $F_i$ to the corresponding recipient node $N_i^7$ in group $G^7$ ($1 \leq i \leq k$). This step is represented by communication path(s) 704 to box $G^7$ (distribution) in FIG. 7.

Next, logical step 4 is performed in this scaled distribution example of FIG. 7. Step 4 comprises the following operations:

(a) In group $G^2$, each node $N_i^2$ sends its subfile $F_i$ to all k nodes in group $G^3$ (in a manner as described above with FIG. 8). Thus at the end of this step, each node in group $G^3$ has all subfiles $F_1, \ldots, F_k$ of original file F. This step is represented by communication path(s) 709 to box $G^3$ in FIG. 7.

(b) In group $G^1$, each node $N_i^1$ sends its subfile $F_i$ to all k nodes in group $G^4$ (in a manner as described above with FIG. 8). In this way, at the end of this step, each node in group $G^4$ has all subfiles $F_1, \ldots, F_k$ of original file F. This step is represented by communication path(s) 708 to box $G^4$ in FIG. 7.

(c) In group $G^5$, each node $N_i^1$ opens k concurrent network connections to all k nodes of group $G^6$ for transferring its subfile $F_i$ (in a manner as described above with FIG. 8). At the end of this step, each node in the group $G^6$ has all subfiles $F_1, \ldots, F_k$ of original file F. This step is represented by communication path(s) 710 to box $G^6$ in FIG. 7.

(d) In the same logical step 4, in the group $G^7$, each node $N_i^1$ sends its subfile $F_i$ to the rest of the nodes in the group. In this way, at the end of this step, each node in group $G^6$ has all subfiles $F_1, \ldots, F_k$ of original file F. This step is represented by the communication path(s) 707 to box $G^7$(collection) in FIG. 7, and is analogous to the collection step described above with the FastReplica in the Small algorithm.

Techniques for improving the reliability of the above-described scalable distribution algorithm to account for failed nodes may be implemented, such as those techniques disclosed in commonly assigned U.S. Published Patent Application Number 2004/0143647 titled "SYSTEM AND METHOD FOR EFFICIENTLY REPLICATING A FILE AMONG A PLURALITY OF RECIPIENTS IN A RELIABLE MANNER", the disclosure of which is hereby incorporated herein by reference.

A relatively simple induction rule defines the number of nodes to which the original file F can be replicated in 4 logical steps (such as the 4 logical steps of FIG. 7): $k \times (2^2 + 2^1 + 2^0)$, which is graphically shown in FIG. 9.

The example considered above with FIG. 7 can be generalized to the arbitrary number of algorithm steps i, where $i \geq 2$. The number of nodes to which original file F can be replicated in i algorithm steps is defined by the following formula:

$$k \times \sum_{j=2}^{i} 2^{i-j}.$$

From this binary representation, the rules for constructing the corresponding distribution lists of nodes are straightforward. Once the nodes to be included in a distribution list are determined, constructing such distribution lists may be performed in accordance with techniques well known in the art. That is, it is within the skill of those in the art to construct such a distribution list, and therefore the technical details of the distribution lists construction is not elaborated on further herein so as not to detract from the inventive features described herein for distributing a file from an origin node to a plurality of recipient nodes.

The scalable FastReplica algorithm is based on the reasoning described above. Consider the problem of replicating file F across nodes $N_1, \ldots, N_n$ and let $$\frac{n}{k} = m.$$

Then, all of the nodes may be partitioned into m groups: $G^1, G^2, \ldots, G^m$, where each group has k nodes. Any number m can be represented as $m=2^{i_1}+2^{i_2}+ \ldots +2^{i_j}$ (referred to herein as "equation 1"), where $i_1>i_2> \ldots >i_j \geq 0$. Practically, this provides a binary representation of a number m. Then schematically, the scalable FastReplica algorithm replicates file F to corresponding groups $G^1, G^2, \ldots, G^m$ in $i_1+2$ steps as graphically shown in FIG. 10.

Figure 10:
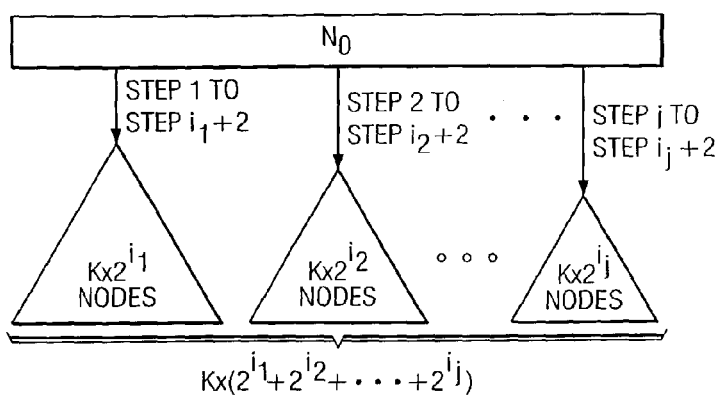
FIG. 10 shows a graphical representation of the number of recipient nodes to which a file F can be replicated in j logical steps in accordance with the scalable file distribution process of FIG. 7.

If the targeted number n of nodes for a file replication is not a multiple of k, i.e., $$\frac{n}{k} = m + r,$$

where r<k, then there is one "incomplete" group G' with r nodes in it. A preferred way to deal with this group is to arrange it to be a leaf-group in the biggest sub-tree (i.e., the sub-tree having the longest path from node $N_0$), which replicates the original file to $2^{i_1}$ groups as shown in FIG. 10, e.g., group G' is assigned group number $2^{i_1}$.

As an example, let k=10. How many algorithm steps are used in the example scalable FastReplica algorithm described above to replicate the original file F to 1000 nodes? Using equation 1 above, the following representation for 1000 nodes is derived: $1000=10\times(2^6+2^5+2^2)$. Thus, in 8 algorithm steps (each taking the $$\frac{1}{k}\text{-th}$$

portion of the file to transfer), the original file F will be replicated among all 1000 nodes.

As one example application of embodiments of the present invention, consider the distribution of streaming media files within a CDN. In order to improve streaming media quality, the latest work in this direction proposes to stream video from multiple edge servers (or mirror sites), and in particular, by combining the benefits of multiple description coding (MDC) with Internet path diversity. MDC codes a media stream into multiple complementary descriptions. These descriptions have the property that if either description is received it can be used to decode the baseline quality video, and multiple descriptions can be used to decode improved quality video.

Thus, for a media file encoded with MDC, different descriptions can be treated as subfiles, and a distribution technique, such as the above-described FastReplica technique, can be applied to replicate them. That is, while the above examples describe partitioning a file into subfiles based, for example, on the number k of concurrent communication connections that can be supported by a node, in certain embodiments the distribution technique may be utilized with a file F encoded with multiple descriptions, wherein each of the multiple descriptions may be distributed to recipient nodes in the manner in which the above-described subfiles of a file F are described as being distributed.

Taking into account the nature of MDC (i.e., that either description received by the recipient node can be used to decode the baseline quality video), the reliability of the scaled FastReplica algorithm may be improved. For instance, when using the example scaling technique described above for distributing a media file encoded with MDC, even if failed nodes exist in the distribution tree, this example scaled FastReplica technique may provide a suitable distribution technique because receipt by nodes below the failed node(s) in the distribution tree of a portion of the descriptions (from the working nodes of the higher level) will be enough to decode the good quality video. That is, when using a group-to-group distribution technique, if one of the nodes in a first group responsible for distributing a particular subfile to the nodes of a second group fails, then the nodes of the second group will not receive this particular subfile. However, the nodes of the second group will still receive the subfiles from the working nodes of the first group, and with MDC encoding, such portion of the total number of subfiles may be sufficient to enable the nodes of the second group to decode the media file.

Various elements for performing the above-described file distribution functions of embodiments of the present invention may be implemented in software, hardware, firmware, or a combination thereof. For example, software may be used on an origin node $N_0$ for determining logical groupings of recipient nodes and/or for partitioning file F into the appropriate number of subfiles. As another example, network interfaces may be used to concurrently communicate subfiles from an origin node to recipient nodes of a distribution group (e.g., in the distribution step of FastReplica), as well as for communication of such subfiles between recipient nodes of the distribution group (e.g., in the collection step of FastReplica).

When implemented via computer-executable instructions, various elements of embodiments of the present invention for distributing file F from an origin node to recipient nodes are in essence the software code defining the operations of such various elements. The executable instructions or software code may be obtained from a readable medium (e.g., a hard drive media, optical media, EEPROM, EEPROM, tape media, cartridge media, flash memory, ROM, memory stick, and/or the like) or communicated via a data signal from a communication medium (e.g., the Internet). In fact, readable media can include any medium that can store or transfer information.

What is claimed is:

1. A method for transferring a file over a network comprising:
partitioning a file into a plurality of subfiles;
distributing the plurality of subfiles from a first node to a first group comprising plurality of recipient nodes, wherein at least one subfile is distributed from the first node to each recipient node of said first group but not all of said plurality of subfiles are distributed from the first node to any of the recipient nodes of said first group; and said plurality of recipient nodes of said first group exchanging their respective subfiles such that each recipient node of said first group obtains all of said plurality of subfiles.

2. The method of claim 1 wherein said distributing comprises:
distributing a different subfile to each of said recipient nodes of said first group.

3. The method of claim 1 wherein said partitioning comprises:
partitioning said file into said plurality of subfiles corresponding in number to a number of said recipient nodes in said first group.

4. The method of claim 1 wherein said partitioning further comprises:
partitioning said file into said plurality of subfiles that are each approximately equal in size.

5. The method of claim 1 further comprising:
determining a number of said subfiles to partition said file into.

6. The method of claim 5 wherein said determining comprises:
determining a suitable number of concurrent communication connections that can be used for communication of information between one of the nodes and a plurality of the other nodes; and
determining said number of subfiles as corresponding in number to said number of concurrent communication connections.

7. The method of claim 1 further comprising:
determining a number of said recipient nodes to include in said first group.

8. The method of claim 7 wherein said determining comprises:
determining a suitable number of concurrent communication connections that can be used for communication of information between one of the nodes and a plurality of the other nodes; and
determining said number of recipient nodes to include in said first group as corresponding in number to said number of concurrent communication connections.

9. The method of claim 1 wherein said distributing comprises:
distributing the plurality of subfiles to said plurality of recipient nodes of said first group concurrently.

10. The method of claim 1 wherein said distributing comprises:
distributing the plurality of subfiles via a communication network to which said first node and said plurality of recipient nodes of said first group are communicatively coupled.

11. The method of claim 10 wherein said distributing comprises:
distributing the plurality of subfiles to said plurality of recipient nodes of said first group via concurrent communication connections of said first node to said communication network.

12. The method of claim 1 wherein said plurality of recipient nodes of said first group exchanging their respective subfiles further comprises:
each of said plurality of recipient nodes establishing concurrent communication connections to every other recipient node of said first group.

13. The method of claim 1 wherein said first node and said plurality of recipient nodes of said first group each comprise a server computer.

14. The method of claim 13 wherein said first node and said plurality of recipient nodes are distributed server computers in a Content Distribution Network (CDN).

15. The method of claim 1 further comprising:
said first group of recipient nodes communicating said file to a second group comprising a plurality of recipient nodes.

16. The method of claim 15 further comprising:
each recipient node of said first group communicating a subfile to every recipient node of said second group such that said recipient nodes of said second group each receive all of said plurality of subfiles.

17. The method of claim 15 further comprising:
each recipient node of said first group communicating the subfile that it received from said first node to every node of the second group.

18. The method of claim 17 wherein each recipient node of said first group communicates the subfile that it received from said first node to every node of the second group concurrently.

19. A system for transferring a file over a network comprising:
means for partitioning a tile into a plurality of subfiles;
an origin node comprising means for distributing all of said plurality of subfiles from said origin node to a first group comprising a plurality of recipient nodes, wherein at least one subfile is distributed from the origin node to each recipient node of said first group but not all of said plurality of subfiles are distributed from the origin node to any of the recipient nodes of said first group; and
said recipient nodes of said first group each comprising means for exchanging their respective subfiles received from said origin node such that each recipient node of said first group obtains all of said plurality of subfiles.

20. The system of claim 19 wherein said means for distributing distributes a different subfile from said origin node to each of said recipient nodes of said first group.

21. The system of claim 19 wherein said means for partitioning partitions said file into said plurality of subfiles that are each approximately equal in size.

22. The system of claim 19 further comprising:
means for determining a suitable number of concurrent communication connections that can be used for communication of information between one of the nodes and a plurality of the other nodes; and
means for determining a number of subfiles into which said partitioning means is to partition said file as corresponding in number to said determined number of concurrent communication connections.

23. The system of claim 19 further comprising:
means for determining a suitable number of concurrent communication connections that can be used for communication of information between one of the nodes and a plurality of the other nodes; and
means for determining a number of recipient nodes to include in said first group as corresponding in number to said number of concurrent communication connections.

24. The system of claim 19 wherein said means for distributing distributes the plurality of subfiles to said plurality of recipient nodes of said first group concurrently.

25. The system of claim 19 wherein said means for exchanging of each of said plurality of recipient nodes establishes concurrent communication connections to every other recipient node of said first group.

26. The system of claim 19 further comprising:
means for communicating said file from said first group of recipient nodes to a second group comprising a plurality of recipient nodes.

27. The system of claim 26 wherein each recipient node of said first group comprises means for communicating a subfile to every recipient node of said second group such that said recipient nodes of said second group each receive all of said plurality of subfiles.

28. The system of claim 26 wherein each recipient node of said first group comprises means for communicating the subfile that it received from said origin node to every node of the second group concurrently.

29. A system for transferring a file over a network comprising:
an origin node operable to partition a file into a plurality of subfiles, wherein said plurality of subfiles correspond in number to a number of recipient nodes in a first group to which said file is to be distributed;
said origin node operable to distribute all of said plurality of subfiles to said recipient nodes, wherein a different subfile is distributed from said origin node to each of said recipient nodes; and
said recipient nodes operable to exchange their respective subfiles received from said origin node such that each recipient node obtains all of said plurality of subfiles.

30. The system of claim 29 wherein said plurality of subfiles are each approximately equal in size.

31. The system of claim 29 wherein said origin node is operable to determine a suitable number of concurrent communication connections that can be used for communication of information between one of the nodes and a plurality of the other nodes, and said origin node is operable to determine a number of said subfiles into which said file is to be partitioned as corresponding in number to said determined number of concurrent communication connections.

32. The system of claim 29 wherein said origin node is operable to determine a suitable number of concurrent communication connections that can be used for communication of information between one of the nodes and a plurality of the other nodes, and said origin node is operable to determine a number of recipient nodes to include in said first group as corresponding in number to said number of concurrent communication connections.

33. The system of claim 29 wherein said origin node is operable to distribute the plurality of subfiles to said plurality of recipient nodes of said first group concurrently.

34. The system of claim 29 wherein each of said recipient nodes is operable to communicate the subfile that it received from said origin node to every other recipient node of said first group concurrently.

* * * * *

UNITED STATES PATENT AND TRADEMARK OFFICE
CERTIFICATE OF CORRECTION

PATENT NO. : 7,174,334 B2  
APPLICATION NO. : 10/345716  
DATED : February 6, 2007  
INVENTOR(S) : Ludmila Cherkasova It is certified that error appears in the above-identified patent and that said Letters Patent is hereby corrected as shown below:

On the face page, in field (54), in column 1, in "Title", lines 2-3, after "FILE" delete "AMONG A PLURALITY OF RECIPIENTS".

In column 1, lines 2-3, after "FILE" delete "AMONG A PLURALITY OF RECIPIENTS".

In column 18, line 54, after "media," delete "EEPROM" and insert -- EPROM --, therefor.

In column 18, line 65, in Claim 1, after "comprising" insert -- a --.

In column 20, line 26, in Claim 19, delete "tile" and insert -- file --, therefor.

Signed and Sealed this

Twentieth Day of January, 2009

JON W. DUDAS  
*Director of the United States Patent and Trademark Office*